April 26, 1960 D. N. SHARMA 2,933,886
TURBOJET ENGINE CONVERTIBLE TO RAMJET ENGINE
Filed April 15, 1953 7 Sheets-Sheet 2

FIG_4

FIG_5

FIG_6

FIG_7

FIG_8

FIG_8a

INVENTOR
Devendra Nath Sharma,
BY John B. Brady
ATTORNEY

April 26, 1960   D. N. SHARMA   2,933,886
TURBOJET ENGINE CONVERTIBLE TO RAMJET ENGINE
Filed April 15, 1953   7 Sheets-Sheet 6

INVENTOR
Devendra Nath Sharma,
BY John A. Brady
ATTORNEY

April 26, 1960   D. N. SHARMA   2,933,886
TURBOJET ENGINE CONVERTIBLE TO RAMJET ENGINE
Filed April 15, 1953   7 Sheets-Sheet 7

INVENTOR
Devendra Nath Sharma,
BY
ATTORNEY

United States Patent Office 2,933,886
Patented Apr. 26, 1960

2,933,886

TURBOJET ENGINE CONVERTIBLE TO RAMJET ENGINE

Devendra Nath Sharma, London, England

Application April 15, 1953, Serial No. 348,947

9 Claims. (Cl. 60—35.6)

This invention relates to improvements upon internal combustion turbines, turbojet engines and ramjet combinations employing axial, centrifugal or other types of compressors.

One of the objects of my invention is to provide a turbojet engine assembly consisting of a housing, a compressor section, a combustion chamber section, a turbine section and a reaction cone section positioned within the housing successively in the order named and coacting one with the other and including means in the reaction cone section for igniting the exhaust products from the turbine section and directing the discharge of the exhaust products from the downstream end of the assembly for thereby developing increased thrust and improving the jet power.

Another object of my invention is to provide a construction of turbojet engine including a reaction cone section on the downstream end thereof containing a reaction cone which divides the said reaction cone section into two parts for directing the discharge of exhaust products from the turbine section through a central core surrounded by a toroidal sheath of exhaust products with means located in the reaction cone for igniting the exhaust products within the central core and developing therefrom increased thrust forces.

Still another object of my invention is to provide an arrangement of turbojet engine, including a turbine section and a reaction cone section located in the downstream end thereof, where such section is divided into an annular portion and a central core portion with means located in the said central core portion which burns the exhaust products delivered thereto from the turbine section for increasing the thrust forces.

A further object of my invention is to provide a construction of turbojet engine assembly including a compressor section, a combustion chamber section, a turbine section and a reaction cone section with a hollow shaft extending therethrough for directing cooling air to the burning and turbine drive components while distributing warm air to a position adjacent the upstream end of the assembly for preventing the accumulation of ice around the intake of the engine and developing maximum jet power.

Still another object of my invention is to provide a turbojet engine assembly including a compressor section, a combustion chamber section, a turbine section and a reaction cone section containing a reaction cone therein with a burner located within the reaction cone and with a flame guard disposed between the turbine section and upstream end of the reaction cone section for isolating the operation of said burner from said turbine section and developing within said cone thrust forces from the ignition of the exhaust products from the downstream end of the turbine section in addition to the thrust delivered by the turbine section.

A still further object of my invention is to provide a construction of jet engine in which the central rotary shaft of the engine is provided with hollow channels through which a centralized cooling and heating system is provided running synchronously with engine requirements, that is, as the engine runs faster and becomes hotter a greater supply of cold air is supplied through the hollow channels of the shaft system for cooling the hot parts of the engine, while heat supplied through the channels of the shaft is utilized for de-icing the engine, thus facilitating successful operation of the engine under conditions of extremely low temperatures.

Other and further objects of my invention reside in the dual channel balanced rotor for a turbine jet engine as set forth more fully in the specification hereinafter following by reference to the accompanying drawings, in which:

Fig. 6 is a transverse sectional view taken on line 6—6 of Fig. 1a;

Fig. 18 is an enlarged cross sectional view taken through the turbine and of another form of hollow shaft rotor embodying my invention and illustrating particularly the manner of directing hot gases through the hollow shaft for de-icing the engine;

Fig. 19 is an enlarged cross sectional view of a fragmentary portion of the rotor system in the form of my invention illustrated in Figs. 11–18, and showing the sectionalized construction of the rotor with the aligned passages for distribution of air through the interior parts of the rotor;

Fig. 20 is a fragmentary longitudinal sectional view clarifying the arrangement of parts shown in Fig. 8a;

This invention is applicable to all systems, forms and methods of internal combustion turbine construction. In the jet propulsion system of my invention, the incoming air at its initial entry into the engine is divided into two parts, one part passing through the compressor and the burners, and finally driving the turbine and making its exit via the exhaust nozzle. The second part of the incoming air passes centrally through the engine, cooling the bearings, the lubricating oil, the turbine disc and the turbine blades, the supportive structures and the journaling. The arrangement by which the cooling air mixes with gases in the exhaust nozzle or preferably by a separate channel via the hollow reaction cone, i.e. a central nozzle for the exit of gases, constitutes one of the main features of this invention.

My invention envisages the construction of a jet propulsion engine operating efficiently with de-icing means and a variable area exhaust nozzle and also providing for:

(1) Afterburning;
(2) Operation as a by-pass jet engine;
(3) Operation as a ramjet engine.

My invention may be applied to a conventional jet engine alone or in association with afterburning. The several alternative combinations may be described as follows:

(i) Utilizing afterburning as indicated in the drawings.

(ii) (a) By-pass effect utilized by feeding ambient air via the various air inlets downstream from the turbine.

(b) By feeding compressed air from the engine compressor communicating with an associated perforated reaction cone via a hollow central rotary shaft carrying the turbine and the compressor and/or hollow supportive "spiders" for the said perforated reaction cone coupled by suitable pipes communicating with the compressor; whereby comparatively cold air is intermixed with intensely hot gases effecting efficient operation, greater thrusts and fuel saving.

(c) Ram-jet effect in said turbojet engines by the selective control of a multiplicity of shutters for the admission of ambient air at very high speeds of aircraft. A flameguard is employed in the assembly acting as a diffuser, distributor, pressure equalizer, pressure reactor shield, and protector for protecting the turbine disc and anti-icing equipment from flame and corrosive action of extreme high temperature gases.

It will be understood, therefore, that the assembly of the instant invention employs different types of means for propulsion cooperating conjugatively by an interrelated cooperation in a single engine for producing tremendous boost and greater altitude operation where the air is extremely thin and scarce.

The turbojet engine may be employed for take-offs and the initial stage of ascending. Afterburning is provided to give added bursts to speeds whenever necessary and to reach interceptor heights with the minimum of delay.

The turbine discs which support the turbine blades are perforated and are hollow, with channels and inlets communicating with the supportive disc, whereby the cooling gases can circulate freely, thus cooling these very hot and most vulnerable parts of the turbine engine. Each turbine disc is provided with a collar-like projection at right angles to its body, so that when several of these blades are assembled on the turbine disc, a continuous circular ridge projecting towards the reaction cone body, or the burners, is formed. This projection forms a protective shield between the reaction cone body and the turbine blades which prevents the hot gases from the burners from entering the hollow reaction body. The collar forms a circular projection which may be supported by the turbine disc instead of the turbine blades.

By the term "reaction cone body" is meant a specialized construction according to this invention constituting a hollow perforated body concentrically placed inside the reaction cone section in alignment with the upstream end of the exhaust jet nozzle by suitable supportive spider-web arms, which, while serving the normal purpose allocated to a normal reaction cone as in a normal jet propulsion engine also serves the purpose, due to its specialized constructional features of a:

(a) By-pass for the hot gases from the turbine disc, turbine and the inner central parts of the engine, and may serve as a by-pass to any air bled from the main compressor for cooling, as a by-pass for this bled air to render greater thrusts compatible with fuel saving and a passage for the said bled air for burning extra fuel in the main nozzle.

(b) By-pass for ambient air admitted through ports and channels provided in the engine jet-nozzle and hollow supportive "spiders."

The second part of the cool air admitted from the outside can, after cooling the turbine blades, etc., make its exit by mixing with the gases from the various burners and is discharged via the exhaust nozzle. Ordinarily the mixing of the comparatively cold air with the very hot gases from the various burners causes a lowering of temperature of the very hot thrust creating gases in the exhaust nozzle, and even with a reduction of 2% to 3% of this temperature, a serious lowering of the efficiency of and performance of the engine becomes noticeable. To prevent this mixing of the two sets of gases at different temperatures, I provide a hollow cone that is shaped in such a manner that the turbine disc or turbine blades form a rotary air-tight joint by means of a circular projecting lip, which prevents the hot issuing gases from the burners from entering the hollow reaction cone or vice versa, i.e., the cold and the hot gases cannot mix with one another. The conical end of the reaction cone is further provided with an exit pipe separate from and protruding through the middle of the exhaust nozzle. This separate pipe forms the outlet for the cooling gases and serves as a ramjet or afterburning exit.

The "spider" is made hollow for the purpose of accommodating inside cooling radiator means for the hot lubricant for the engine. Due to the impingement of the incoming cold air the oil inside these radiators is cooled and this impingement also serves the second useful purpose of preventing ice formation.

To prevent this ice formation, electrical heating means may be incorporated with these supportive "spiders." Further, additional hot air may be admitted to keep the front "spider" at a suitable temperature and to prevent ice formation. The several arms of the rear streamlined "spider" are made hollow to allow the ingress of the cold air from a scoop situated at the outer casing, which casing supports the "spider," so that air or other suitable coolant is admitted, forced or sucked in via this scoop or opening into the hollow body of the "spider." These hollow inlets thus communicate or terminate inside the hollow reaction cone, so that cold air or the coolant in its passage through the hollow "spider" channel cools the "spider" and finally makes its exit through the elongated pipe situated at the conical end of the reaction cone.

The exhaust nozzle is much longer than the conventional size to provide an efficient form of ram jet and afterburning effect. The central pipe forming the outlet from the modified reaction cone is either circular or rectangular in cross-section.

By incorporating a set of burners inside the elongated hollow "reaction cone" and which is supplied with ample air from the several multi-air inlets situated at various parts of the engine, a very effective ramjet effect alone or in association with a venturi tube is produced. Similarly, afterburning (in the sense that fuel would be burned after the gases have passed the turbine) can also be conveniently incorporated to give additional thrust, whenever required, by spraying fuel inside any of the exhaust nozzles.

The advantage of the aforesaid turbine engine and ramjet combination lies in that each unit can be run separately or in conjunction with one another at the discretion of the pilot and according to his requirements.

The engine is controlled by varying the areas of the main exhaust nozzle and the central modified reaction cone exit pipe. This is accomplished in the first case by providing a set of annular partitions in two parts inside and near the periphery of the main exhaust nozzle and which operate to close or open by means of suitable cams or levers or helical screw arrangements with the resultant increase or decrease of the effective area of the exhaust nozzle. Similar helical screw, cam and lever arrangements with the resultant increase or decrease of the effective area of the exhaust nozzle. Similar helical screw, cam and lever arrangements are provided to open out or reduce the area of the central pipe or nozzle from the reaction cone. The turbine blades are maintained cool by providing a scoop or protruding annular lip or an air entrance close or in combination with the rear spider air entrance, so that part of the incoming cold air impinges on the tips of the rotating turbine blades. A gas tight rotating joint is formed which prevents the hot gases from the burners from mixing with this incoming cold air. Also, the annular chamber formed between the main exhaust nozzle outer case and the inner variable area mechanism for varying the effective area of the exhaust nozzle is utilized for the exit of this cooling air after cooling the tips of the turbine blades and therefore the temperature of the main jet is not lowered. Fuel may also be sprayed and burned in this annular chamber.

The heat generating source may be provided by the known conventional types of liquid or solid fuels or by means of atomic fission methods.

Ice is prevented from accumulating at the front of the engine by utilizing the cavity in the center of the rotary central shaft for the passage of hot gases or liquids to these colder parts. This central cavity communicates with hollowed-out channels inside the various impeller blades (these blades may be replaced by hollow tubes) which in turn lead to channels inside the rotary drum and the base of the axial compressor rotor blades. By the careful incorporation and communication of these channels, hot oil, hot air, or other hot liquid can be forced to circulate by the aid of a suction pump assisted by the centrifugal motion of the rotary drum, thereby maintaining the rotary drum, the impeller blades, and the axial compressor blades at a suitable high temperature to prevent ice formation. Similarly, the outer casing which supports the stator compressor blades may also be provided with suitable channels for the circulation of the heating medium.

The outstanding features of my invention may be summarized as follows:

(1) The general system of dividing the airstream in two parts, one for the turbojet operation and the second for cooling and by additional heating providing a part of the afterburning thrust.

(2) Method of using annular chambers or several burners supplied with compressed air from the compressor, one set used to drive the turbine, and the other set of burners by-passing the turbine, and utilized for giving added thrust at the will of the operator.

(3) The method of cooling the most vulnerable parts of the engine and which are subjected to terrific strains and stresses at exceedingly high temperatures.

(4) The construction of the turbine disc to act as a compressor in addition to supporting the several turbine blades.

(5) The method of efficient cooling of the turbine disc and blades by perforations, channelling, ribbing, and the modification of the several cooling ridges or "spokes" in the form of compressor blades.

(6) Utility of the modified reaction cone as an outlet for cooling gases and its utilization in the de-icing methods.

(7) Modified reaction cone provided with suitable streamlined air inlets via the supporting spider arms, and means for fuel burning to give added thrusts and contribute towards the ramjet operation.

(8) Modified exhaust nozzle to serve as a turbojet-ramjet combination.

(9) The methods for effecting the co-action and correlation of the turbojet and ramjet afterburning operating singly or collectively.

(10) De-icing system formed by utilizing the heated gases inside the modified hollow reaction cone.

(11) The method of construction and assembly of the axial compressor by the "unit method" and the method of fixing axial blades to the detachable rim fitting on the outside of the compressor drum.

(12) The provision of several controlling shutters in the front and rear for controlling the air entry and nozzle area respectively, and their provision at other positions for the efficient operation of the turbojet-ramjet combinations.

Figure 1:
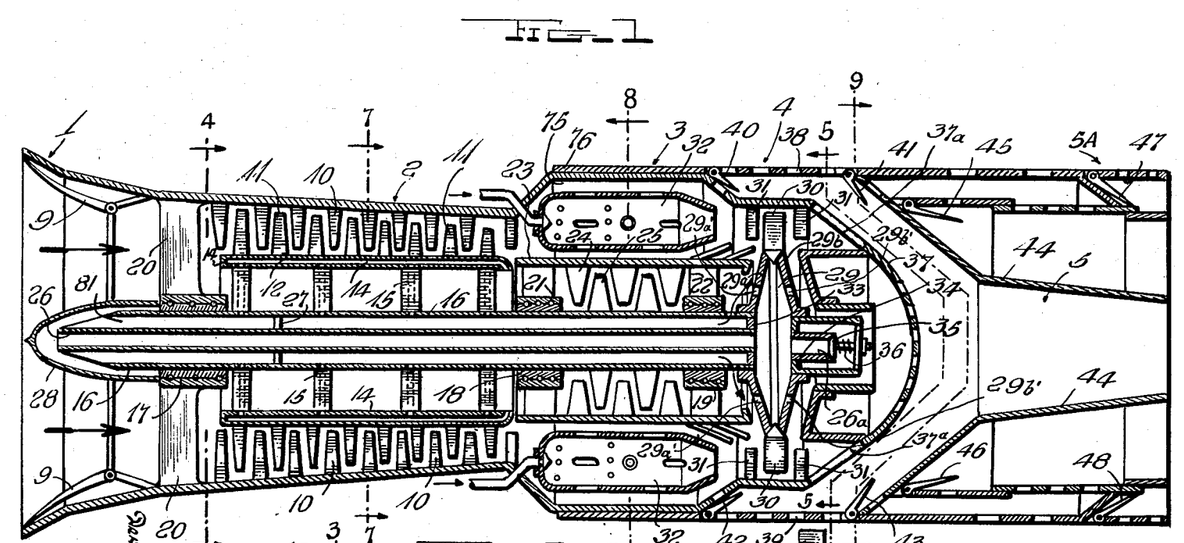
Fig. 1 is a fragmentary longitudinal cross sectional view through the forward section of a turbojet engine embodying my invention.
Figures 1A, 9, 10:
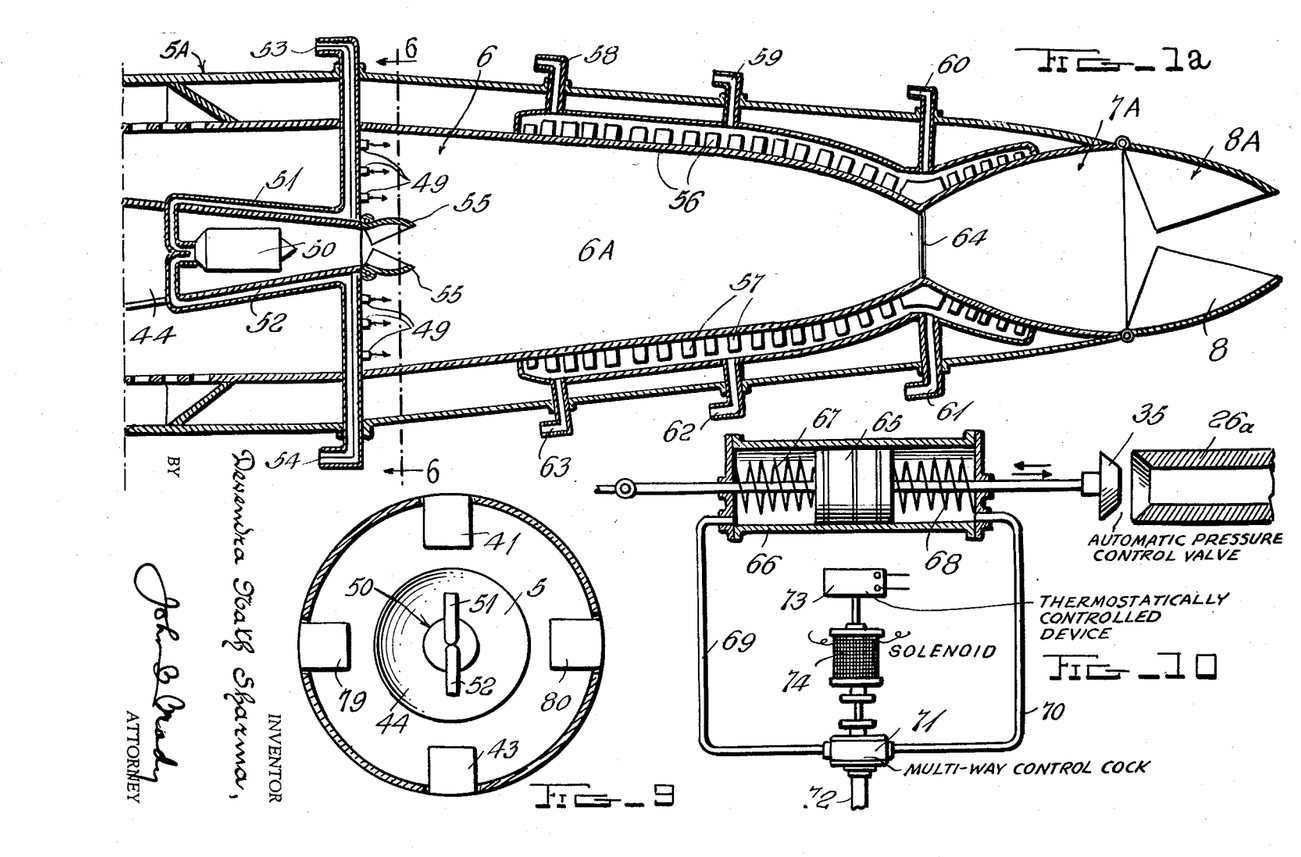
Fig. 1a is a continuation of the view illustrated in Fig. 1 and shows the rearward section of the engine.
Fig. 9 is a transverse sectional view taken on line 9—9 of Fig. 1.
Fig. 10 is a schematic view showing a spring-loaded actuator employed in the engine of my invention and adapted to be operated by compressed air by manual and automatic thermostatic control.

Referring to the drawings in more detail reference character 1 in Fig. 1 illustrates the cold air entry end at the front of the engine consisting of a substantially cylindrical tapered casing constituting a compressor section 2, a high temperature combustion chamber section 3, the turbine section 4, the reaction cone section 5A, containing reaction cone 5, and in Fig. 1a the high temperature afterburner section is designated 6, the ramjet section 6A and 7A, and the exhaust control section 8A arranged as shown.

The cold air entry end of the jet engine shown at 1 is provided with a multiplicity of adjustable shutters 9 which may be adjusted in position to regulate the cold air inlet at the front of the engine. The casing of the compressor section 2 provides mounting means for sets of stator axial compressor blades, represented at 10, with which the rotor blades 11 carried by rotary cylindrical double-walled drum 12 coact. The double-walled drum 12 is constructed to provide a cylindrical channel 14 facing the entry end of the engine and through which the inrushing cold air forcibly circulates. The double-walled rotary drum 12 is supported on radially extending spokes or arms 15, which serve as impellers in drawing air from the entry end of the casing through the interior of the rotor system and through high temperature combustion chamber section 3 for delivery to the reaction cone section 5A. The spokes or impellers 15 have hollow channels therethrough connecting with the cylindrical channel 14 in drum 12 and serve to direct cold air which enters the annular channel 14 into the hollow shaft 16 on which spokes 15 are mounted. The spokes or arms 15 are mounted on the rotor coupled to the turbine and the incidence of the blade arms comprising 15—15 is made in the form of a propeller or a fan blade, so as to act as a means for pushing the incoming air backwards to the rearward part of the engine, passing through the perforated turbine disc 29, then through the flame-guard 37, thence through the hollow reaction cone 44 and finally escaping through the main exhaust nozzle of the jet engine. The flame-guard 37 is substantially dome-shaped with the rounded surface thereof axially aligned with the axis of said turbine and formed on a radius centered on said axis. The hollow shaft 16 with the drum 12 fixed thereto forms the rotor system for the jet engine of my invention. The rotor system is dynamically balanced and is mounted for high speed rotation in sets of anti-friction bearings shown at 17, 18 and 19. The anti-friction bearings 17 are mounted in spider 20 adjacent the front of the engine. The bearings 18 and 19 are mounted in spiders 21 and 22 shown in Figs. 1 and 2. The spiders 21 and 22 are carried by the central cylindrical structure 23 supported on the main casing of the engine. The cylindrical structure 23 forms a mounting for the inwardly extending blade structure 24 which coacts with the outwardly directed blade structure 25 carried by the hollow shaft 16 in a position between bearings 18 and 19. The coacting blades 24 and 25 constitute a two-stage axial cooling pump for forcing air drawn inwardly from the front of the engine 1 interiorly of the drum 12 and around the hollow spokes 15, thus maintaining the drum and the bearings thereof cool in spite of the close association thereof with the high temperature combustion chamber section 3 and the flame of the jet propulsion system. The shaft 16 is constructed from concentrically disposed tubes where the outer tube constituting shaft 16 supports the drum 12 and the blade structure 25 and concentrically surrounds the inner tube 26 with spacing members 27 disposed therebetween at such intervals as will not obstruct the free flow of air through the tubes. Inner tube 26 projects beyond the forward end of the outer tube forming shaft 16 and both tubes have their ends covered by the de-icing hood 28 which is secured to the arms of spider 20. The rear end of hollow tubular shaft 16 carries the turbine disc 29 having a hollow concentric portion formed by two coacting disc sections 29a and 29b shown in Figs. 1, 2 and 18 which support peripherally arranged turbine blades 30 at their peripheries. Turbine rotor blades 30 cooperate with sets of stator blades 31 carried by an inwardly extending portion of the main casing in the path of the high temperature burners 32 arranged concentrically about the cylindrical structure 23 and directed rearwardly of the engine, the said rotor blades 30 and stator blades 31 constituting the complete turbine system. The impulses of the combustion products discharging from the combustion chambers against the turbine blades impart high speed rotation to the rotor system, thus driving the compressor section of the engine and building up the required pressure force to produce the proper coaction with the burners, maintaining the operation of the cooling system, and operating the de-icing system and producing the required thrust forces in coaction with the reaction cone section 5A, in Fig. 1 and in Fig. 1a the afterburner section 6 in Fig. 1, and ramjet sections 6A and 7A. The rotor system includes annular spacer members 33 and 34 aligned with the sides 29a and 29b of the turbine disc and serving to center inner tube 26 adjacent the forward side of the rotor and the aligned portion 26a of the inner tube 26 adjacent the rearward portion of the rotor system. The portion 26a of the inner tube provides an annular valve seat against which the valve disc 35 is seated.

Figures 2, 3:
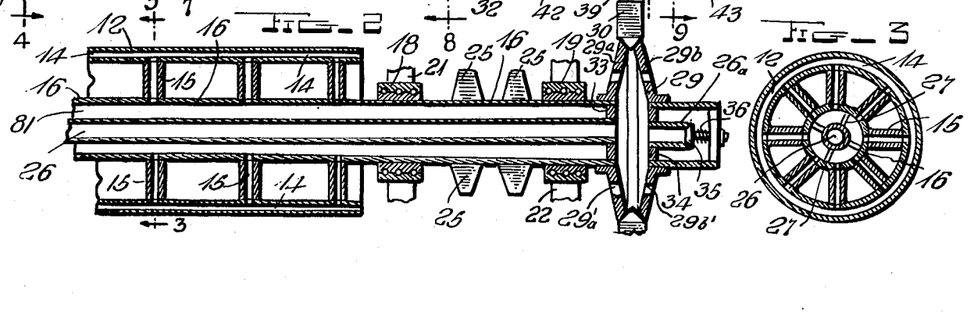
Fig. 2 is a fragmentary sectional view of the rotor unit illustrating more clearly the dual passage through the shaft and the manner of mounting the turbine on one end of the hollow shaft.
Fig. 3 is a transverse sectional view taken on line 3—3 of Fig. 2.
Figure 4:
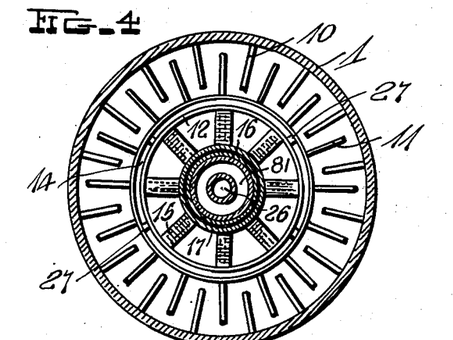
Fig. 4 is a transverse sectional view taken on line 4—4 of Fig. 1.
Figure 5:
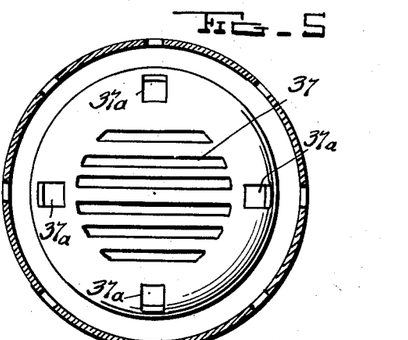
Fig. 5 is a transverse sectional view taken on line 5—5 of Fig. 1.
Figure 6:
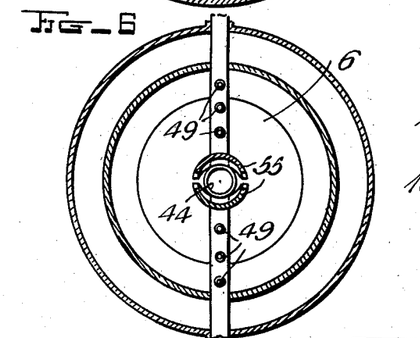
Figure 7:
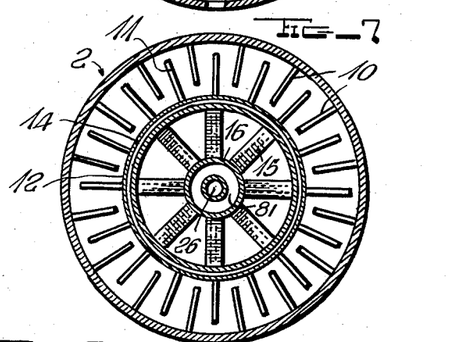
Fig. 7 is a transverse sectional view taken on line 7—7 of Fig. 1.

The valve 35 is a safety valve which protects the rotor system against excessive pressures. The valve 35 may be automatically actuated, as indicated in Figs. 1 and 2, by opening against the tension of spring 36 thereby enabling the gases to pass outwardly through the flame guard 37. The flame guard is centrally supported within the casing by spider arms 37a, in the region of the reaction cone section 5A where the gases are directed through the turbine blades 30 and 31 and mix with the air being drawn inwardly from the side ports 38 and 39. The flame guard performs several functions. It is an integral part of the rear end of the engine assembly around which are designed the various mountings, etc., for the bearings, stator blades 31, 32 and the like. It is, furthermore, a channel which provides means for the escape of hot gases and by-pass air from the compressor via the hollow reaction cone to the jet nozzle. It forms a barrier and serves to protect the vital bearings from excessively hot gases or flame created by afterburning or from the several combustion chambers. It forms a vital component when the jet engine is operated as a ram-jet engine, it acts as an even diffuser of gases and incoming air, as a shield and as a filter for preventing any solid objects being sucked inside the rotary shaft or the bearings. Controllable shutters 40, 41, 42 and 43 are provided for controlling the ingress of air to the reaction cone.

The reaction cone in the afterburner section 6, illustrated in Fig. 1a, as a continuance of Fig. 1, includes the conical section 44 in which the gases are intermixed and burned for developing thrust forces. Additional quantities of air are admitted in the sides of the casing controlled by appropriate shutters 45, 46, 47 and 48 admitting air around the reaction cone and into which fuel is sprayed at 49. The mixture from the reaction cone is fired from burner 50 supplied through fuel lines 51 and 52 connected with the fuel supplies 53 and 54. Suitable shutters 55 are provided for controlling the distribution of the mixture from the reaction cone into the afterburner section 6. The combined mixture is burned by action of the fuel sprayers 56 and 57 as shown in Fig. 1a by a plurality of burners fed from separately controlled fuel supplies represented at 58, 59, 60 and 61, 62, 63. The burning mixture is supplied to the venturi tube 64 in the nozzle section where the fuel is discharged under high pressure through the exhaust and of the casing. As heretofore noted, the exhaust end of the casing is controlled in its cross sectional area by adjustable shutters represented at 8.

In lieu of the automatic pressure control valve shown at 35 in Figs. 1 and 2, I may provide a thermostatically controlled or manually controlled valve arrangement as illustrated in Fig. 10 where the valve 35 is controlled by a double acting piston 65 operating in air control cylinder 66. The air actuated piston 65 is spring cushioned by spring 67 and 68. Air lines 69 and 70 connect with opposite ends of cylinder 66 and are controlled by the multi-way control cock 71 to alternately spray air to opposite ends of the cylinder 66 from the connection to the compressed air source 72. The multi-way cock 71 is controlled manually by the pilot or is controlled automatically from the thermostatically controlled device 73 which controls the energization of solenoid 74 to selectively control cock 71 under conditions where valve 35 must be actuated.

Figure 8:
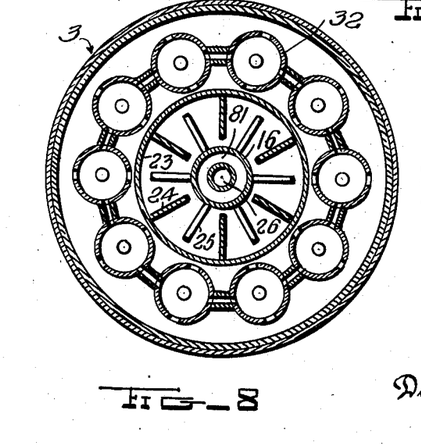
Fig. 8 is a transverse sectional view taken on line 8—8 of Fig. 1.
Figure 8A:
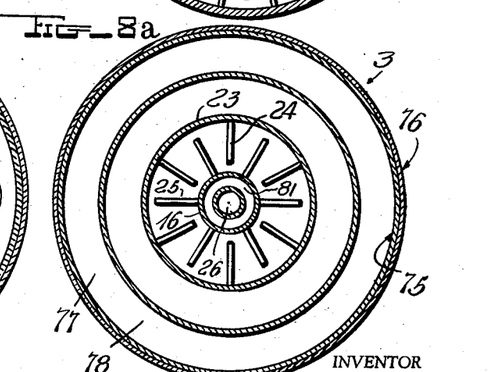
Fig. 8a shows an alternate form of the burner arrangement.
Figure 9:
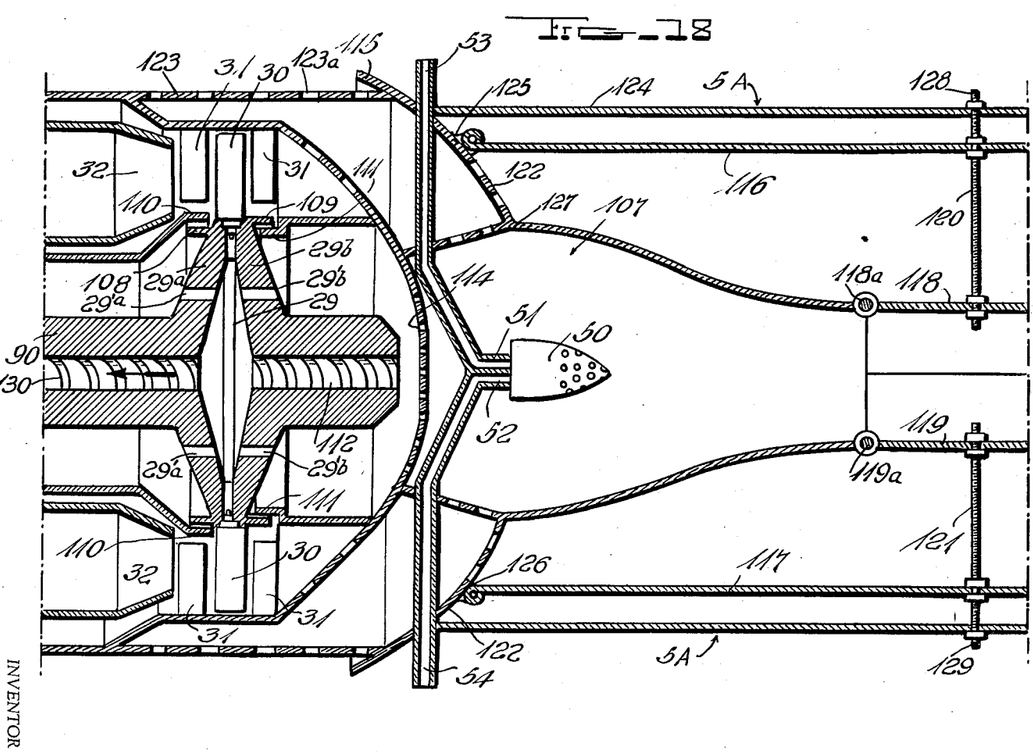
Figure 20:
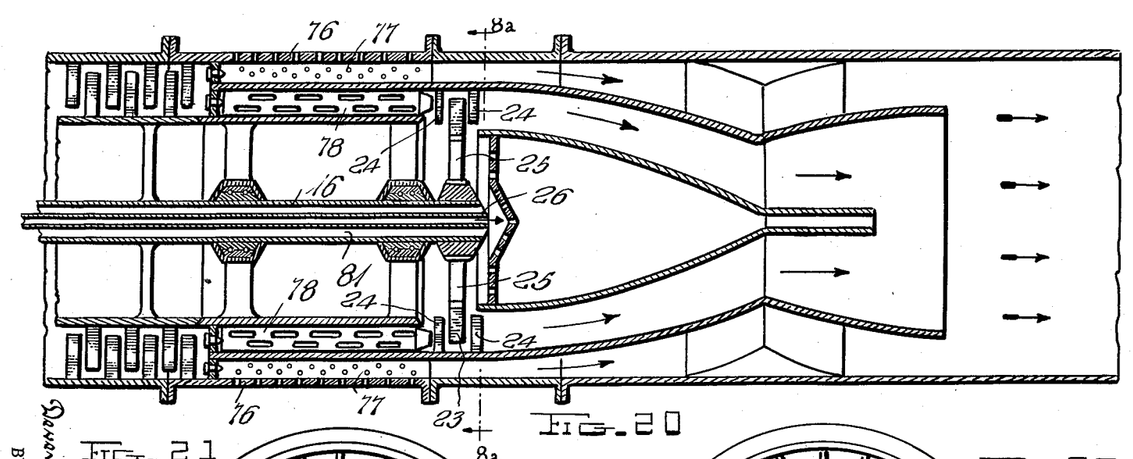
Figure 21:
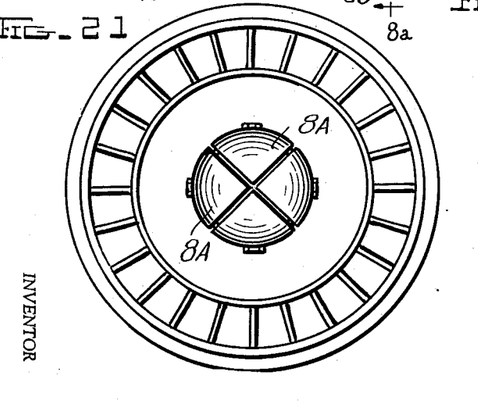
Fig. 21 is an end view of the engine showing the four hinged shutters in closed position.
Figure 22:
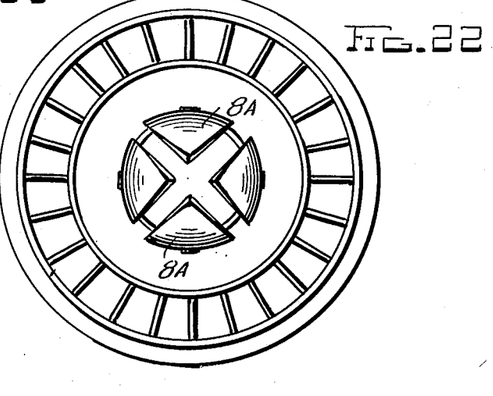
Fig. 22 is a view similar to the view shown in Fig. 21 with the shutters in open position.

In Figs. 4–9, I have represented various sections through the engine of my invention. Figs. 8 and 8a are alternate forms of the arrangement of my invention in which the burners illustrated in Fig. 1 are shown in section in Fig. 8, while in Fig. 8a the burners are shown in a tier arrangement. That is, I provide at the junction of the two parts of the casing forming the engine represented by the inner shell 75 and the outer shell 76 which telescope together in coupling the high temperature combustion chamber section 3 with the turbine section 4, an annular chamber 77 for burners which by-pass the turbine blades and serve as afterburners or boosting or thrust burners. I also provide an annular chamber 78 located concentrically within chamber 77 and in this chamber locate the burners such as 32 for driving the turbine. Thus, two sets of burners are employed in this modified arrangement. Fig. 20 shows in longitudinal section the components as arranged in the transverse sectional view of Fig. 8a illustrating the disposition of the two annularly located combustion chambers which are supplied from a common axial compressor. The products of combustion from the two sets of burner chambers are discharged through the jet propulsion nozzle.

In Fig. 9 I have represented the manner of controlling the air distribution by shutters which are designated at 41 and 43 in Fig. 1. At this section I also provide symmetrically arranged shutters 79 and 80 adjustable in a manner similar to the adjustment of shutters 41 and 43.

It will be observed that the cold air in flowing through the compressor section 2 in the form of my invention illustrated in Figs. 1–10 follows at least three paths, that is, a path immediately conforming with the inner section of compressor section 2 constituted by sets of coacting blades 10 and 11 through the burners 32 and the turbine 29 to the reaction cone section 5A, finally passing through the exhaust jet. A second path is provided for the cold air from the compressor section through a by-pass constituted by the thrust burners. A third path for the cold air is provided through the central portion of the rotor constituted by the impellers and spokes 15, the turbine disc 29, the reaction cone section 5A, the burner fuel sprayers 56 and 57, to the exhaust jet. The cold air in the course of its passage passes through the spaced wall of drum 12 at channel 14, and through the hollow spokes or impellers 15 radially inwardly to the outer annular channel 81 between inner tube 26 and outer tube 16. The direction of flow of air in outer annular channel 81 is predominantly toward the upstream end of the engine and beneath the de-icing hood 28, returning through the center of the inner tube 26 to the turbine 29. Thus the colder air travels along the outside path toward the upstream end of the engine serving to cool the bearings for the rotor system, while the air at more elevated temperature moves through the inner tube 26 toward the downstream end of the jet circulating beneath the de-icing hood 28. Thus the bearings and the central portion of the engine remain relatively cool and the air is prepared by increase in temperature for most efficient use in the reaction cone section 5A. It will be observed that the air moves in one direction in the outer tube and in the opposite direction in the inner tube.

Figs. 11–19 illustrate modified forms of my invention in which provision is made for de-icing of the engine. In this arrangement I have illustrated the parts of the engine in the same general relation as set forth in Figs. 1–10, except that the rotor system is built up by a multiplicity of coacting rotor sections illustrated more clearly in Fig. 19, as consisting of aligned sections 11, 83, 84, 85, 85' etc., each having hollow rim portions supported by hollow spoke or impeller portions represented at 86, 87, 88, 89, etc., which terminate in hubs which surround the hollow tubular shaft 90 which extends longitudinally of the engine. The hollow rim portions of sections 83, 84, 85, 85', etc. are individually supported at spaced intervals with respect to each other and each concentrically inter-engage each other by spaced but mutually connected rims containing annular offset portions or portions including annular steps therein of complementary shapes in diagonally opposite positions laterally thereof that fit annularly one into the other forming a hollow rimmed rotor unit when the several sections are built into an end-to-end stack with the sections adjacent each other. The front section constituting the rotor is shown at 91 carrying the de-icing head 92. The successive rotor sections fit directly behind the front section 91 and the hollow spokes or impellers thereof connect with the hollow interior of shaft 90 through suitable radially disposed apertures indicated at 86a, 87a, 88a and 89a on diametrically opposite sides of the hollow shaft 90. The shaft 90 is journaled in bearings represented at 93, 94, 95 and 96, supported on spiders extending from the substantially cylindrical structure constituting the casing 131. These bearings may be of the anti-friction type. In this form of my invention a pair of turbines, shown at 97 and 98, are carried by the rotor system and are driven from the combustion chambers represented at 99. Shaft 90 carries the compressor 100 which forces cold air through the impellers such as shown at 86, 87, 88 and 89, and through ports 86b, 87b, 88b and 89b etc., and over the journals where the air is intermixed with the gaseous discharge through the turbines and delivered through the reaction cone shown in this form of my invention at 101. Compressor unit 100 is a means for cooling the inside of the engine and the turbine disc etc., by sucking in cold air at the front of the engine and forcing it through the several apertures in the turbine disc. The compression unit 100 does not force air through impellers 86–89, but only draws air from the front of the engine which passes these impellers. This cold air after cooling the turbine disc mixes with the gaseous discharges in the exhaust nozzle via the perforated exhaust cone 101 of Fig. 11. The mixture is fired by burner 50 and directed to the exhaust tube 102 with the addition of air from the ports 103 and 104. The fuel to burner 50 is supplied as previously explained through fuel lines 53 and 54. In order to provide proper air supply I arrange a scoop or flange 105 adjacent ports 106 in the casing 132, for directing additional air to the burners 99.

Figures 11, 17:
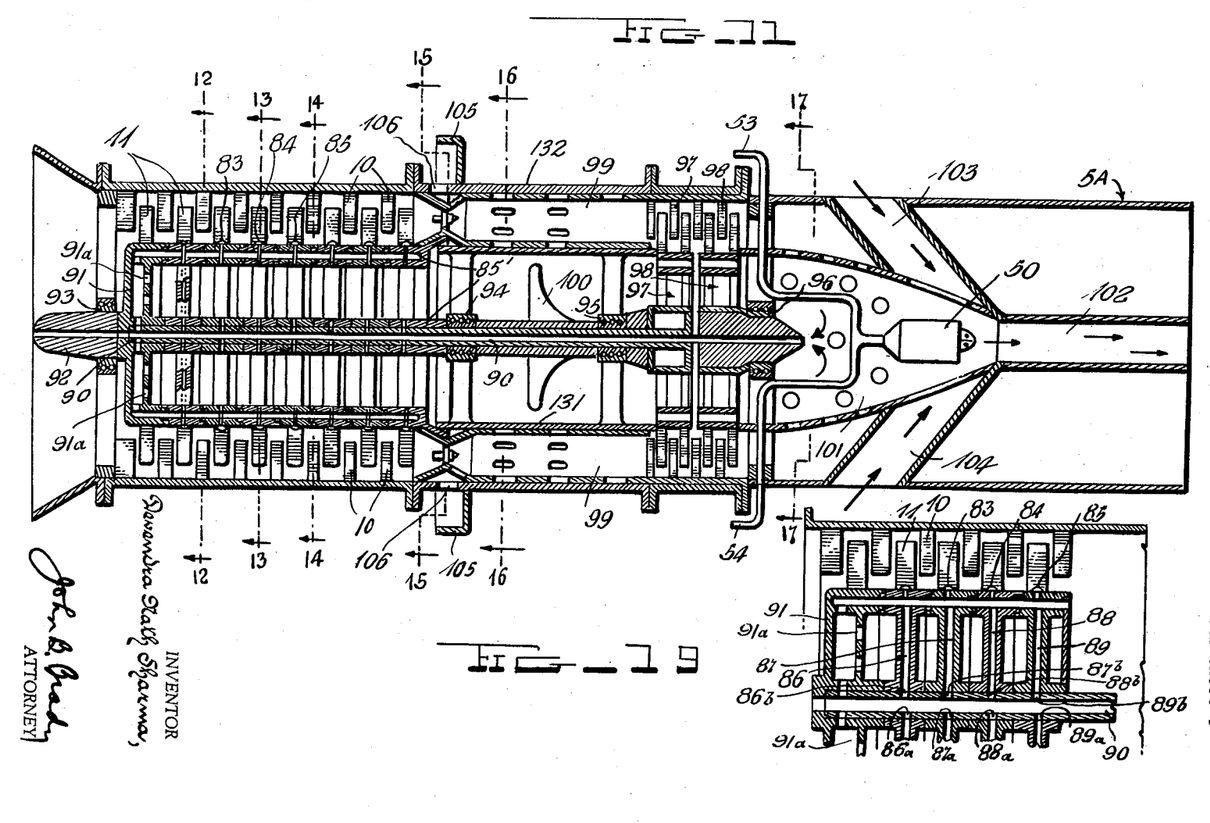
Fig. 11 is a longitudinal sectional view through a modified form of engine embodying my invention.
Fig. 17 is a transverse sectional view taken substantially on line 17—17 of Fig. 11.
Figure 12:
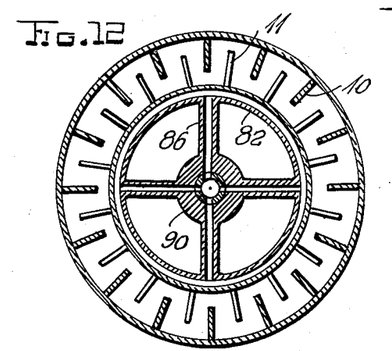
Fig. 12 is a transverse sectional view taken on line 12—12 of Fig. 11.
Figure 13:
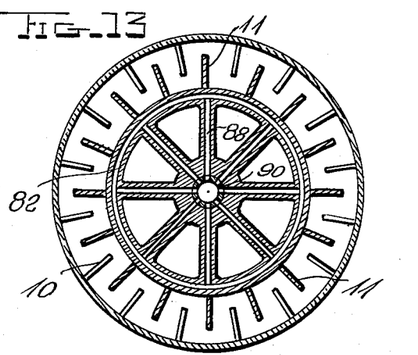
Fig. 13 is a transverse sectional view taken on line 13—13 of Fig. 11.
Figure 14:
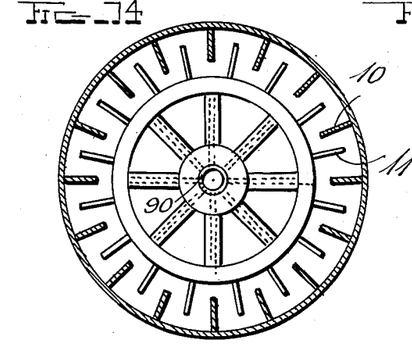
Fig. 14 is a transverse sectional view taken on line 14—14 of Fig. 11.
Figure 15:
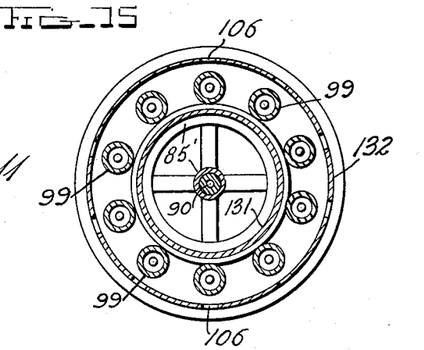
Fig. 15 is a transverse sectional view taken substantially on line 15—15 of Fig. 11.
Figure 16:
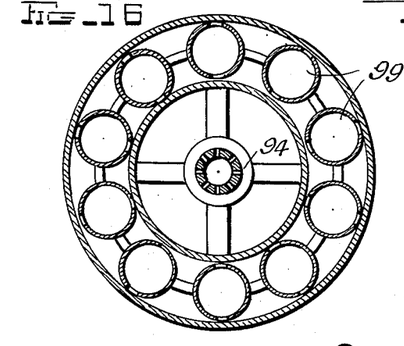
Fig. 16 is a transverse sectional view taken on line 16—16 of Fig. 11.
Figure 17:
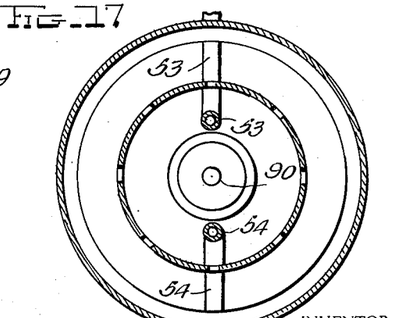

A portion of the heated air in the reaction cone 101 is directed through the hollow bore of shaft 90 where it circulates through the impeller and the hollow rims of the rotor sections and through the de-icing hood 92. Thus the working parts of the engine are maintained at high temperature and the accumulation of ice prevented. The rotor drum constituted by the built-up sections carries the rotor blades 11 coacting with the stator blades 10 directed from the interior of the casing.

The sectional views, Figs. 12–17, serve to clarify the structure of the engine at the different sections thereof.

In Fig. 18 I have shown a further modification for the end of the rotor arrangement.

The modified form of hollow reaction cone shown at 107 becomes filled with hot gases and air due to the passage of the air passing through channels in the hot turbine disc 29 and due to the heating action of the disc resulting from the passage of very hot gases surrounding the reaction cone which eventually pass out via the exhaust nozzle. The hot air and gases are also under pressure, assisted by a pump, centrifugal action of the rotary drum and helical rifling 130 inside the hollow shaft 29 which forces the hot gases and air via the inside of the hollow rotary shaft 90. Helical rifling is a helical channel cut inside a hollow shaft and when the shaft rotates at high speed the air inside is forced at great pressure. The hot gases pass through the central hollow shaft 90 and through the channels communicating with the hollow impeller blade arms or via hollow tubes, to the main body of the channelled drum which in turn communicates with the base of the axial compressor blades mounted on a rim outside the rotary drum. Finally the hot gases and air make their exit via several perforations at the back of the front spider arms shown in Fig. 19 at 91a, thereby preventing or eliminating any ice formation. These gases then enter the compressor and mix with the cold air being compressed.

The pressure (ambient) under which these gases are caused to move is sufficient to facilitate the thorough circulation of the hot gases via the central hollow rotary shaft, assisted by rifling or a suitable pump for the circulation of hot gases. The hot gases instead of circulation may escape via several perforations 91a provided in the body of the rotary drum supporting the axial compressor. The system is equally applicable to centrifugal or any other type of compressor. I have shown how the hot air and gases are supplied directly to the front supporting spider arms, which warm the front of the engine via several perforations in the spider arms, so that the front of the engine, most susceptible to ice formation, is subjected to warm air, and thus the ice is prevented from forming or getting a foothold or is eliminated on formation, greatly assisted by vibration of the engine.

The front section 91 of the rotor system differs from the aligned stacked sections 83, 84, 85, 85' etc., by reason of the arrangement of the perforations 91a in the rear of the spider arms, enabling the escape of the warm air where it will be of maximum effect in preventing or reducing ice. The accumulation of the hot air in the hollow shaft 90 in the front spider arms also protects the front of the rotor system from the accumulation of ice.

In the arrangement illustrated in Fig. 18, special precaution is taken in providing pressurized gas-tight joints between moving parts by the provision of flanges 108 and 109 on the rotor 29 which establish overlapping rotative connection with the stator flanges 110 and 111 connected with the main structure of the engine. The intake for the hollow shaft 90 of the rotor system is represented at 112 located behind the perforated flame guard or baffle shown at 114. The hot gases are directed through the hollow shaft 90 in the direction of the arrow for supplying heat to the de-icing system. In the form of by invention shown in Fig. 18, air supply is assured in the reaction cone section 5A by the scoop effect of the extending lip 115 on the intermediate perforated support 122 that connects the reaction cone 107 to the stator housing 123 for directing air into and around the reaction cone 107. The stator housing 123 is perforated at 123a for directing air into the reaction cone section 5A. Air-directing vanes are provided at 116 and 117 adjustable in relation to the shutters 118 and 119 through screw-threaded adjustable rods and coacting nut assemblies shown at 120 and 121. The shutters 118 and 119 are hingedly mounted on the rearward end of the reaction cone 107 at 118a and 119a, as shown. The intermediate perforated support 122 extends from the stator housing 123 in rearward spaced relation to the perforated flame guard 114 and provides a support for the cylindrical housing 124 of the reaction cone section 5A. The four air-directing vanes 116, 117, shown in Fig. 18, have to be adjusted simultaneously to establish equilibrium in the nozzle and to discharge the gas effluents in the desired direction that is straight downstream or relatively up, down, or sideways. The adjustment is necessary owing to the amount of fuel being burned inside the exhaust nozzle, as with the increase in the fuel being burnt, a relative increase in the exhaust nozzle area becomes necessary for successful and effective afterburning, ramjet and by-pass engine operations. The intermediate perforated support 122 also serves to support the hinged mounting 125 and 126 for the air-directing vanes 116 and 117, respectively, which are adjustable in angular position within the cylindrical housing 124. The hinged mountings 125 and 126 for the air-directing vanes 116 and 117 are located between the exterior of the reaction cone 107 and the interior of the cylindrical housing 124. The interior perforated support 122 connects with the reaction cone 107 at the position of maximum diameter thereof with the section of the reaction cone 107 tapering from said position of support represented at 127 to diameters of smaller section, both upstream and downstream of the position of support at 127. The shutter 118 and the air-directing vane 116 are adjusted simultaneously about their hinged connections 118a and 127, respectively, by the screw-threaded adjusting rod 120 which is adjustably anchored in the cylindrical housing 124 by the adjustable nut operating on the screw-threaded extension of rod 120, as indicated at 128. Similarly, the shutter 119 is connected through the screw-threaded adjustable rod 121 with the air-directing vane 117, which shutter 119 and air-directing vane 117 are adjusted simultaneously about the hinged connections 119a and 126 by means of the screw-threaded nut 129 engaging the screw-threaded extension on adjustable rod 121.

The ports 29a' and 29b' in the sides of the turbine disc are provided for cooling purposes. The cooler air which is forced through these ports serves to maintain the sides 29a and 29b of the hollow turbine and the entire turbine disc sufficiently cool to insure reliable and continuous operation.

The purpose of providing the cylindrical casing for the jet power plant is to provide a substantially leak-proof communicating gas pathway between the components of the power plant.

The reaction cone within the reaction cone section which communicates with the hollow shaft serves the purpose of an outlet for hot gases from the inside of the engine and as a channel for by-passing air from the main compressor to the jet-nozzle for cooling and the securing of extra fuel-burning and ramjet and by-pass purposes. The power plant assembly of the structure of my invention is such that the jet engine can be operated with high efficiency or may be employed as a by-pass engine, or a ramjet engine, or an afterburning jet engine.

The reaction cone 107 is disposed concentrically within the reaction cone section 5A and there is an annular zone for the discharge of exhaust products through the perforated flame guard 114 between the inside wall of the housing formed by the reaction cone section 5A and the outside of the reaction cone 107. This annular zone of exhaust products emanating in an annular sheath through the discharge end of the housing formed by the reaction cone section 5A surrounds the central core of exhaust products which are discharged from the reaction cone 107 and serves to increase the total thrust obtainable by burning the exhaust products by means of burner 50 within the confined central core provided by the reaction cone 107. The downstream end of the reaction cone 107 is protected by the cooler exhaust products which are thrust rearwardly in a toroidal pattern with respect to the central core of burning exhaust products which emanate from the downstream end of the reaction cone. The toroidal sheath of exhaust products surrounding the central core of burning exhaust products emanating from the rear of the reaction cone serve as a counter-barrier for the slip stream for separating the cold in-rushing air from the high temperature core and thus increasing the effective thrust of the high temperature core of exhaust products. That is to say, the toroidal sheath of exhaust products acts as a deflector to modify the slip stream flow so far as the burning central core of exhaust products is concerned.

In all forms of my invention I provide for the control of air flow by the proper positioning of shutters and air valves to insure the supply of a proper combustible mixture and the development of maximum ramjet forces. The maximum rotative force is obtained by utilizing the spokes of the rotor as impeller blades in addition to their function as spacer members for mounting the rotary drum. Maximum protection against accumulation of ice is assured by distribution of hot gases in vital positions around the engine. Both the single channel hollow shaft 90 in the form of my invention illustrated in Figs. 11–19, and the dual channel rotary shaft system illustrated in Figs. 1–10 are highly effective.

While I have described my invention in certain of its preferred embodiments I realize that modifications may be made, and it is understood that no limitations upon my invention are intended other than may be imposed by the scope of the appended claims.

What I claim as new and desire to secure by Letters Patent of the United States, is as follows:

1. A turbojet engine comprising a housing, a compressor section, a combustion chamber section, means for introducing fuel for ignition in said combustion chamber section, a turbine section and a reaction cone section positioned within said housing successively in the order named, a reaction cone in said reaction cone section having its base spatially disposed adjacent the downstream end of said turbine section for receiving the discharge therefrom and its apex directed into the downstream end of said reaction cone section, said turbine section including a central tubular shaft journaled in said housing and extending through said housing forwardly from said turbine section, inwardly directed stator blades supported by said housing, a turbine disc carried by said shaft, said turbine disc including rotor blades operating with respect to the stator blades supported by said housing, a flame guard disposed between said turbine section and the upstream end of said reaction cone section, means dividing said reaction cone section into two coacting portions wherein both of said portions receive exhaust products discharged from said turbine section, means for adding fuel in one of said portions for igniting the discharge from said turbine section therein and means for controlling the discharge of the exhaust products from the downstream ends of both of said coacting portions of said reaction cone section.

2. A turbojet engine as set forth in claim 1 in which the two coacting portions of said reaction cone section are coaxial for dividing the exhaust products into a confined central core of exhaust products and a substantially circular surrounding sheath of exhaust products and wherein the means for igniting the exhaust products is located within the central core of exhaust products confined by the first mentioned one of said coacting portions.

3. A turbojet engine as set forth in claim 1 in which the two coacting portions of said reaction cone section are substantially circular inner and outer discharge chambers concentric with respect to each other and wherein the inner chamber contains said means for igniting the exhaust products therein located immediately adjacent said flame guard.

4. A turbojet engine as set forth in claim 1 in which said two coacting portions of said reaction cone section are concentric, constituting inner and outer portions both extending from an upstream position immediately adjacent said flame guard to a downstream position, means for directing the flow of exhaust products from said turbine section into a pair of coaxial paths of flow, one of said paths extending coaxially of said inner portion and the other of said paths extending within said housing and around the exterior of said reaction cone and wherein the means for igniting the exhaust products is located centrally within said inner portion.

5. A turbojet engine comprising a tubular rotary shaft, a compressor section and a combustion section concentrically disposed about said shaft successively in the order named, a turbine comprising a hollow turbine disc adjacent the end of said combustion chamber section carried by said shaft and connected to the tubular interior thereof, said turbine disc constituting a rotor having upstream and downstream portions and being ported around the sides thereof, turbine rotor blades carried by said rotor, a stator comprising a substantially cylindrical stator casing extending upstream and downstream with respect to said disc and having annular stator flanges thereon offset with respect to each other and directed toward opposite sides of the periphery of said disc at a position adjacent the rotor blades thereon, said disc having annular flanges extending from the upstream and downstream portions thereof, the annular flange on the downstream portion of said disc extending in offset overlapping relation to the stator flange at the downstream portion of said disc and the annular flange on the upstream portion of said disc extending in offset overlapping relation beneath the stator flange at the upstream portion of said disc and coacting to provide a substantially gas-tight joint between the rotor and stator, a stator housing surrounding said stator casing adjacent said turbine disc and carrying radially inward projecting stator blades thereon coacting with the rotor blades on said disc, a perforated flame guard extending laterally within said stator housing adjacent said stator casing and transversely of the end of said tubular rotor shaft, a reaction cone section axially aligned with said flame guard and secured to said stator housing a reaction cone disposed in said reaction cone section in the path of the discharge from said turbine, and a burner located within said reaction cone.

6. A turbojet engine as set forth in claim 5 in which combustion chambers extend longitudinally in a position between said housing and said casing on the upstream end of said stator and are distributed in a circular path terminating adjacent said stator blades for generating a pressure head through said stator and rotor for driving said disc and said tubular rotary shaft, and wherein said perforated flame guard is substantially dome-shaped with the rounded surface thereof formed on a radius centered on the axis of said turbine.

7. A turbojet turbine engine as set forth in claim 5 in which said stator extends in spaced relation to said housing throughout the lineal distance occupied by said stator, and wherein there is a circular zone of perforations in said housing throughout said lineal distance for directing air into said reaction cone section in a path surrounding said cone.

8. A turbojet engine as set forth in claim 5 in which said flame guard includes a perforated support extending from said housing in a position spaced upstream from said reaction cone section and connected with said reaction cone section, a cylindrical casing carried by said intermediate perforated support forming a continuation of said housing and concentrically surrounding said reaction cone section, said reaction cone section having the upstream end thereof opening through said perforated flame guard into said stator casing and the open end of said tubular rotary shaft and wherein there are means connected with the downstream end of said reaction cone section for controlling the discharge therefrom, including a pair of coacting vanes and an adjacent additional pair of coacting vanes carried by said intermediate perforated support in a position intermediate said housing and said reaction cone section, and adjustable means interconnecting the immediately adjacent vanes.

9. A turbojet engine as set forth in claim 5 in which said reaction cone section is surrounded by a cylindrical housing connected with said stator housing through an intermediate perforated support, said perforated support being spaced from said perforated flame guard, said reaction cone section including a reaction cone having an intermediate portion tapering in opposite directions to smaller portions, said intermediate perforated support being connected with said reaction cone at said intermediate portion thereof, said reaction cone having one end thereof connected with said perforated flame guard and the other end thereof tapering in a downstream direction, two sets of vanes located within said cylindrical housing, the vanes of one of said sets of vanes being pivotally connected with the downstream end of said reaction cone and the vanes of the other set of said vanes being pivotally connected with said intermediate perforated support in a position between the interior of said cylindrical casing and the exterior of said reaction cone, and adjustable means extending between said vanes of each of the sets of vanes for adjusting the discharge egressing from said turbine.

References Cited in the file of this patent

UNITED STATES PATENTS

| | | |
|---|---|---|
| 2,455,313 | Osofsky | Nov. 30, 1948 |
| 2,599,470 | Meyer | June 3, 1952 |
| 2,630,678 | Pratt | Mar. 10, 1953 |
| 2,636,665 | Lombard | Apr. 28, 1953 |
| 2,639,579 | Willgoos | May 26, 1953 |
| 2,641,902 | Kerr | June 16, 1953 |
| 2,643,085 | Durkin et al. | June 23, 1953 |
| 2,696,078 | Waitzman | Dec. 7, 1954 |
| 2,708,340 | Rainbow et al. | May 17, 1955 |
| 2,801,071 | Thorp | July 30, 1957 |

FOREIGN PATENTS

| | | |
|---|---|---|
| 121,367 | Great Britain | Dec. 19, 1918 |
| 195,736 | Switzerland | July 16, 1938 |